United States Patent [19]

Beck

[11] 4,336,592

[45] Jun. 22, 1982

[54] ANTISKID CONTROL SYSTEM FOR BRAKES WHICH EXHIBIT LARGE CHANGES IN LINING FRICTION COEFFICIENT

[75] Inventor: Arnold A. Beck, Clinton, Ohio

[73] Assignee: Goodyear Aerospace Corporation, Akron, Ohio

[21] Appl. No.: 161,812

[22] Filed: Jun. 23, 1980

[51] Int. Cl.³ .............................................. B60T 8/08
[52] U.S. Cl. ..................................... 364/426; 303/105
[58] Field of Search ................ 364/426; 303/103, 105, 303/106, 112

[56] References Cited

U.S. PATENT DOCUMENTS

| | | | |
|---|---|---|---|
| 3,718,374 | 2/1973 | Ochia | 364/426 X |
| 3,998,496 | 12/1976 | Bernabo et al. | 303/106 |
| 4,043,607 | 8/1977 | Signorelli et al. | 303/112 X |
| 4,094,555 | 6/1978 | Byrne et al. | 303/105 X |
| 4,260,200 | 4/1981 | Brearley et al. | 303/105 X |

Primary Examiner—David H. Malzahn
Attorney, Agent, or Firm—P. E. Milliken; E. W. Oldham; R. L. Weber

[57] ABSTRACT

An antiskid control system is presented which includes variable gains to compensate for brakes which exhibit large changes in lining friction coefficient. Fundamentally, the invention includes a pressure transducer and associated amplifier which presents an output signal corresponding to brake pressure. An accelerometer is connected to a second amplifier which presents an output signal analogous to brake torque. These two signals are combined in a summing circuit and the function obtained therefrom is used to modify the control signal from the antiskid control circuit. Effectively, this function provides a modification of antiskid system gain.

11 Claims, 4 Drawing Figures

4,336,592

ANTISKID CONTROL SYSTEM FOR BRAKES WHICH EXHIBIT LARGE CHANGES IN LINING FRICTION COEFFICIENT

BACKGROUND ART

The invention herein relates generally to control systems and, more particularly, to antiskid brake control systems of the type presently utilized in the aircraft industry. It has been found that on some aircraft brakes that the coefficient of friction of the brake disks themselves may vary over a range of 5 to 1. Presently known antiskid systems cannot provide efficient braking over this entire range. The problem inherent in presently existing antiskid systems is that such systems respond to skid depth to control brake pressure rather than brake torque when the true desire of such systems is to control brake torque. In aircraft braking systems, the relationship between torque and brake pressure may change significantly for different braking conditions. For example, at a low energy condition, the desired foot-pounds of braking torque may be achieved at 400 psi of braking pressure, but under a high energy condition, such as on a rejected takeoff, the same foot-pounds of brake torque may require 2,000 psi of brake pressure. Accordingly, there is a significant tremendous change in system gain between the low and high energy conditions.

In the past, it has been found that it is extremely difficult to obtain good braking efficiency over the whole range of possible system gains. While the problem might be resolved if a reliable torque transducer and mounting were developed and the antiskid system made responsive thereto, such has not been the case. The industry is thus confronted with the fact that in many applications the relationship between brake torque and brake pressure is represented by a family of curves mostly dependent upon braking energy or the energy of the body being stopped.

It is therefore advantageous to provide an antiskid system in which the antiskid gain may be modified as a function of brake torque and brake pressure. In such a manner, the antiskid system will be equally sensitive and responsive in both low and high energy conditions and varying degrees thereof.

DISCLOSURE OF INVENTION

In light of the foregoing, it is an object of an aspect of the invention to provide an antiskid system for aircraft wherein the system gain changes according to changes experienced in brake torque.

Still another object of an aspect of the invention is to provide an antiskid system wherein the gain thereof changes according to vehicle deceleration.

An additional object of an aspect of the invention is to provide an antiskid system wherein the gain thereof changes as a function of the combination of brake torque and brake pressure.

Still another object of an aspect of the invention is to provide an antiskid system wherein the gain thereof is variable to achieve safe, efficient braking conducive to passenger comfort and in a cost-effective manner.

Yet another object of an aspect of the invention is to provide an antiskid system of variable gain which may be readily implemented with presently existing antiskid systems.

The foregoing and other objects of the invention which will become apparent as the detailed description proceeds are achieved by an antiskid control system for a braked wheel vehicle wherein the system includes a brake on a wheel, a control valve regulating pressure at the brake, and a control circuit connected to the control valve and applying thereto an antiskid control signal, the improvement comprising first means connected to the brake for producing an output signal corresponding to the brake pressure at the brake; second means connected to the vehicle for producing an output signal analogous to the instantaneous torque of the brake; summing means interconnected between said first and second means for receiving and summing said output signals therefrom; and modification means for receiving both the antiskid control signal and the sum of said output signals from said summing means, said modification means modifying the antiskid control signal as a function of said sum and then supplying the modified antiskid control signal to the control valve.

BRIEF DESCRIPTION OF DRAWINGS

For a complete understanding of the objects, techniques, and structure of the invention, reference should be had to the following detailed description and accompanying drawings wherein.

BEST MODE FOR CARRYING OUT THE INVENTION

Figure 1:
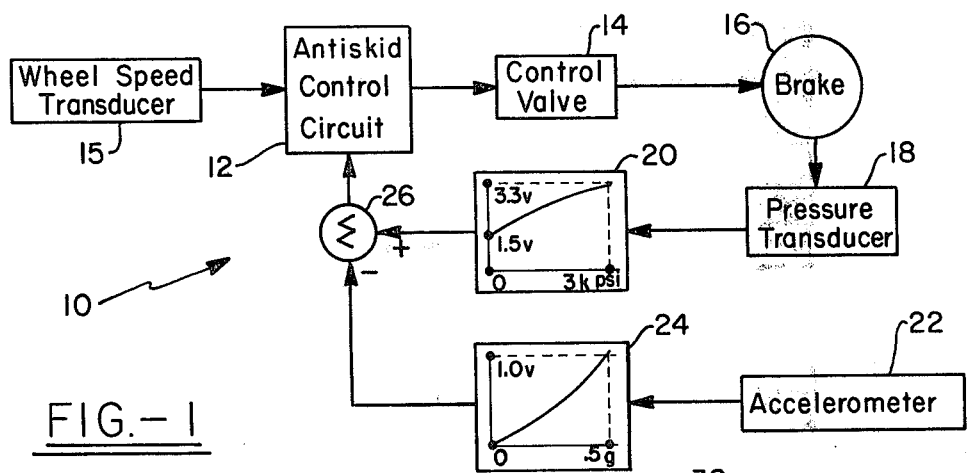
FIG. 1 is a functional block diagram of an antiskid system made in accordance with the teachings of the invention.

Referring now to the drawings and more particularly FIG. 1, it can be seen that an antiskid system of the invention is designated generally by the numeral 10. In standard fashion, the system includes a wheel speed transducer 15 associated with the braked wheels of the aircraft and presenting a varying output signal corresponding to the instantaneous rotational speed of the wheels. An antiskid control circuit 12 receives the outputs of the transducers 15 and, depending upon the nature of the circuit 12, senses therefrom any insipient or deep skids which might be experienced by the wheels. The antiskid control circuitry 12 regulates an antiskid control valve 14 associated with each or pairs of the braked wheels. When a skid is sensed, the circuit 12 presents an output signal to the antiskid valve 14 to effect an appropriate release of brake pressure to the brake 16 in standard fashion.

Connected to the brake 16 is a pressure transducer 18 which presents an electrical output signal corresponding to the pressure applied to the brake. It will become apparent to those skilled in the art that a signal analogous to the brake pressure signal from the transducer 18 might also be obtained from the modulator voltage of the antiskid control circuit 12. However, since the pressure transducer 18 presents an absolute measurement of brake pressure, the preferred embodiment of the invention utilizes such a structure. In any event, a pressure signal is applied as from the pressure transducer 18 to a pressure signal generator 20 which converts the output of the transducer 18 to a nonlinear signal tailored for the particular aircraft to utilize the system.

With further reference to FIG. 1, an accelerometer 22 presents an electrical output signal corresponding to instantaneous aircraft deceleration. As is well known to those skilled in the art, there is a close relationship between vehicle deceleration and brake torque. Accordingly, the output of the accelerometer 22 is an indicia of brake torque, and the same is applied to the deceleration signal generator 24 which again is tailored to the characteristics of the particular aircraft.

The outputs of the signal generators 20,24 are summed at the summing point 26 and thence applied to the antiskid control circuit 12 to modify the antiskid gain. Since the outputs of the circuits 20,24 are additive to achieve the desired gain, it will be appreciated that the characteristics of those two circuits must be determined with due consideration given to each other.

Figure 2:
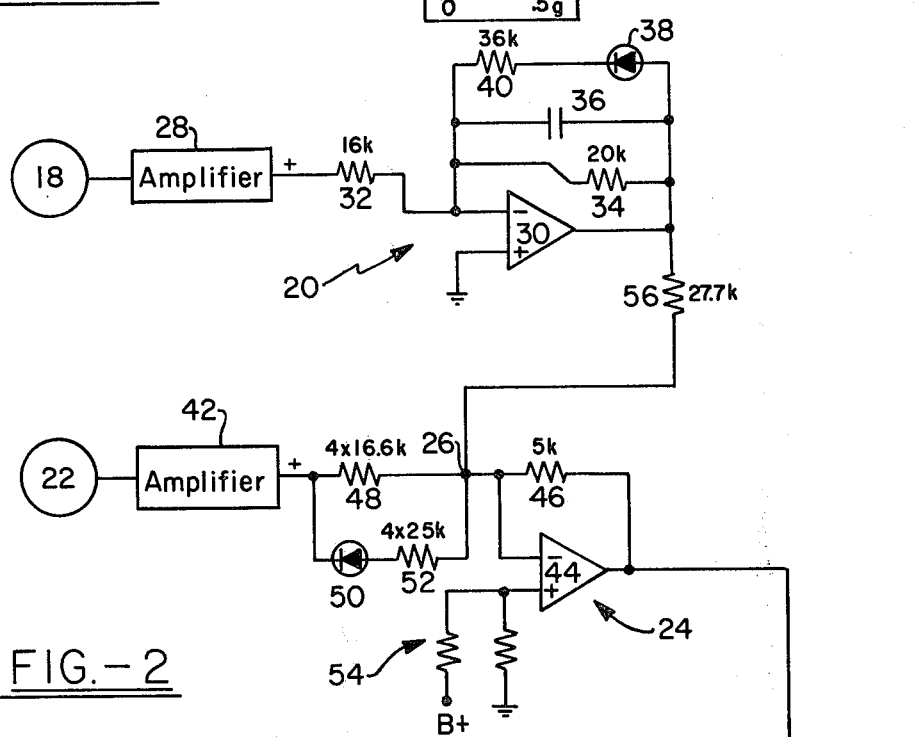
FIG. 2 is a detailed circuit schematic of the structure of FIG. 1 showing a preferred embodiment thereof.
Figure 2:
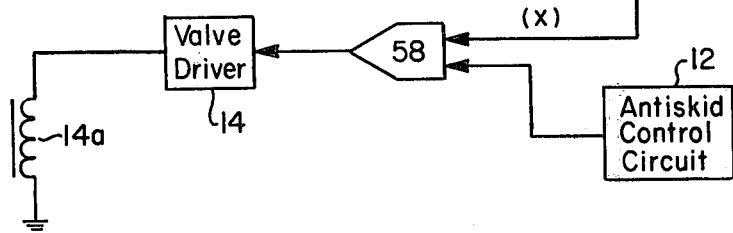

By way of example, to understand the operation of the circuitry of FIG. 1 and before elaborating upon the circuitry of FIG. 2, certain operating parameters of an antiskid system should be understood. If high brake pressure is evidenced from the transducer 18, and low deceleration is evidenced by the accelerometer 22, the situation is indicative of a low coefficient of friction at the brake disks. Accordingly, the gain of the circuit 12 as it affects the control valve 14 must be high. Similarly, if a high brake pressure results in a high deceleration rate, then this is indicative of a normal coefficient of brake friction, indicating the desire of a medium gain for the control circuit 12 and valve 14. When there is low brake pressure and a low rate of deceleration, the same is typically indicative of a normal coefficient of friction of the brakes, but on a wet runway. The gain of the antiskid control should be in the medium to low range. Finally, when the brake pressure is low and the deceleration rate is high, there is a high coefficient of brake friction and the lowest system gain is desired. These considerations are used in formulating the structure of the generators 20,24, as set forth in some particularity in FIG. 2.

With reference to FIG. 2, it can be seen that the output of the pressure transducer 18 is applied to an amplifier 28 for purposes of scaling the brake pressure signal. This signal is applied to the operational amplifier 30 including feedback resistor 34 and input resistor 32, set for fixing the amplifier gain. A capacitor 36 is included for filtering purposes. Of particular importance, a branch of the feedback network of the amplifier 30 includes a zener diode 38 in series connection with the resistor 40. In the embodiment shown, the zener diode 38 has a threshold voltage of 6.2 volts, such that the circuit of the operational amplifier 30 exhibits a change in gain at an output of 6.2 volts.

Figure 3:
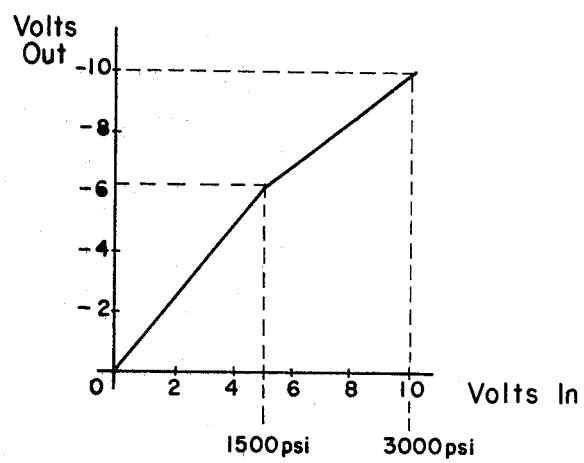
FIG. 3 is a graph illustrating the response of the circuit of FIG. 2 with respect to changes in brake pressure.

The graph of FIG. 3 illustrates the dual gain characteristic of the circuit 20. As shown, the gain changes at the zener voltage of 6.2 volts, corresponding in the example shown to a brake pressure of 1500 psi. The graph of FIG. 3 illustrates the relationship between the output of the amplifier 30 in volts and the pressure applied to the brake in psi as sensed by the transducer 18. It will be appreciated that the amplifier 28 has been selected with an appropriate gain such that the output thereof evidences a linear relationship between voltage and brake pressure with 10 volts equating to 3000 psi.

The output of the accelerometer 22 is applied to a scaling amplifier 42 which has a linear gain set such that a deceleration of 16 feet per second squared equates to 10 volts. This output signal is applied to the operational amplifier 44 as shown. A feedback resistor 46 combines with an input resistor 48 to achieve a first gain for the amplifier 44. A second gain for the amplifier is experienced when the output of the scaling amplifier 42 exceeds the breakdown voltage of the zener diode 50, 5 volts, placing the resistor 52 in parallel with the input resistor 48 and thus modifying the gain of the amplifier 44. It will be noted that the amplifer 44 includes a bias level set by the voltage divider 54 on the positive input thereof. This bias level functions in standard fashion to shift the output of the amplifier 44 by 1.5 volts.

Figure 4:
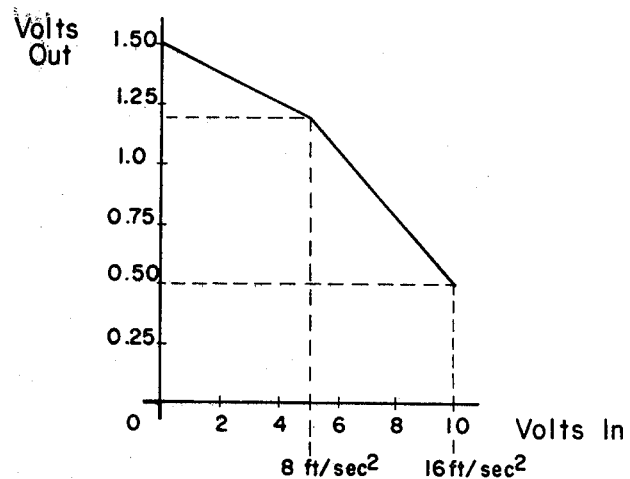
FIG. 4 is a graph illustrating the response of the circuit of FIG. 2 with respect to changes in brake torque.

FIG. 4 illustrates the relationship between the output of the amplifier 44 and the deceleration signal received from the circuit 24, corresponding to brake torque. As shown, the gain of the amplifier 44 changes at 5 volts, corresponding to a deceleration of 8 feet per second squared. The graph of FIG. 4 is illustrative of the operation of the amplifier 44 when there is no input provided from the amplifier 30. However, as shown, the amplifier 30 is connected to the negative input of the amplifier 44 through the input resistor 56. Accordingly, the resistors 46,56 determine the gain for the brake pressure signals from the amplifier 30. The aggregate output of the amplifier 44 is thus the summation of the pressure signal illustrated by FIG. 3 and the corresponding torque signal illustrated by FIG. 4, with each such signal being scaled by the appropriate gain. The gain for the pressure signal is determined by the relationship between the resistors 46,56, while the gain for the torque signal is determined by resistors 46,48,52, with due consideration being given to the breakdown voltage of the zener diode 50.

The output of the amplifier 44 is applied to a multiplier 58 which receives as another input thereto the output of the antiskid control circuit 12. The output of the multiplier 58 is thus a modified antiskid control signal tailored by a multiplication factor which is a function of both brake pressure and brake torque. This signal is applied to the valve driver 14 to control the valve coils 14a in standard fashion. The factor applied to the multiplier 58 by the amplifier 44 is thus used to adjust the antiskid control circuit gain. By way of example, for the specific elements presented in FIG. 2, the following serves to illustrate the manner by which the system gain is modified:

| PRESSURE | DECELERATION | SUMMATION | MULTIPLYING FACTOR (X) |
|---|---|---|---|
| 3000 | 8 | 1.5 + 1.8 − .3 = | 3 |
| 3000 | 16 | 1.5 + 1.8 − 1.0 = | 2.3 |
| 500 | 4 | 1.5 + .35 − .15 = | 1.7 |
| 500 | 16 | 1.5 + .35 − 1.0 = | .85 |

Thus it can be seen that the objects of the invention have been achieved by the structure presented hereinabove. While in accordance with the patent statutes only the best mode and preferred embodiment of the invention has been presented and described in illustrative detail, it is to be understood that the invention is not limited thereto or thereby. Accordingly, for an appreciation of the true scope and breadth of the invention reference should be had to the following claims.

I claim:

1. In an antiskid control system for a braked wheel vehicle wherein the system includes a brake on a wheel, a control valve regulating pressure at the brake, and a control circuit connected to the control valve and applying thereto an antiskid control signal, the improvement, comprising:

first means comprising a first amplifer having variable gain, said first means being connected to the brake for producing an output signal corresponding to the brake pressure at the brake;

second means connected to the vehicle for producing an output signal analogous to the torque of the brake;

summing means interconnected between said first and second means for receiving and summing said output signals therefrom; and modification means for receiving both the antiskid control signal and the sum of said output signals from said summing means, said modification means modifying the antiskid control signal as a function of said sum and then supplying the modified antiskid control signal to the control valve.

2. The improvement in an antiskid control system according to claim 1 wherein said modification means comprises a multiplier receiving as inputs thereto said antiskid control signal and said sum of output signals.

3. The improvement in an antiskid control system according to claim 1 wherein said second means comprises a second amplifer having variable gain.

4. The improvement in an antiskid control system according to claim 3 wherein said first means further comprises a pressure transducer and said second means further comprises an accelerometer.

5. The improvement in an antiskid control system according to claim 3 wherein each of said first and second amplifiers include a zener diode in series connection with a resistor for changing the gain of the associated amplifier.

6. The improvement in an antiskid control system according to claim 5 wherein said summing means comprises an interconnection between said first and second amplifiers.

7. Apparatus for modifying the brake control signal from an antiskid control circuit and for applying such modified signal to a brake valve, comprising:

a first amplifier presenting an output signal corresponding to brake pressure;

a second amplifier presenting an output signal analogous to brake torque;

means operatively interconnected between said first and second amplifiers for modifying the brake control signal as a function of said outputs of said first and second amplifiers; and wherein said first and second amplifiers each include a gain network having a zener diode in series connection with a resistor.

8. The apparatus as recited in claim 7 which further includes a pressure transducer interconnected between the brake valve and said first amplifier.

9. The apparatus as recited in claim 7 which further includes an accelerometer connected to said second amplifier.

10. The apparatus as recited in claim 8 wherein the output of said first amplifier comprises an input to said second amplifier.

11. The apparatus as recited in claim 10 wherein said means comprises a multiplier.

* * * * *